United States Patent [19]

Shimanuki et al.

[11] 3,759,055
[45] Sept. 18, 1973

[54] REVERSIBLY HEAT-RECOVERING TYPE HEAT PUMP THROUGH AIR HEAT SOURCE

[75] Inventors: Takashi Shimanuki, Nara-ken, Nara-shi; Yoshinori Inoue, Osaka-shi, Kita-ku, both of Japan

[73] Assignee: Kabushiki Kaisha Takenaka Komuten, Osaka, Japan

[22] Filed: July 19, 1972

[21] Appl. No.: 273,305

[30] Foreign Application Priority Data
July 22, 1971  Japan.............................. 46/55126

[52] U.S. Cl...................... 62/160, 62/159, 62/324, 62/325
[51] Int. Cl............................................. F25b 13/00
[58] Field of Search...................... 62/159, 160, 324, 62/325

[56] References Cited
UNITED STATES PATENTS
2,152,250  3/1939  Gay...................................... 62/160
2,752,759  7/1956  Sperzel................................ 62/159
2,893,218  7/1959  Harnish................................ 62/324
3,224,214  12/1965  Nickell................................ 62/159
3,264,839  8/1966  Harnish................................ 62/160
3,307,368  3/1967  Harnish................................ 62/324

Primary Examiner—William J. Wye
Attorney—Edwin E. Greigg

[57] ABSTRACT

A reversibly heat-recovering type heat pump through air heat source comprising an outer heat-exchanger exchanging heat between refrigerant and outer air, two inner heat-exchanger acting as condenser or evaporator of the refrigerant, a compressor and an expansion valve. The outer heat-exchanger performs selectively heat discharge to and heat absorption from the outer air. One of the inner heat-exchangers acts as condenser and the other as evaporator.

11 Claims, 2 Drawing Figures

REVERSIBLY HEAT-RECOVERING TYPE HEAT PUMP THROUGH AIR HEAT SOURCE

BACKGROUND OF THE INVENTION

The present invention relates to a heat pump transmitting heat energy from a lower temperature zone to a higher temperature zone and also committing simultaneously both cooling and heating actions of temperature control system.

As a heat pump having such performance hitherto a so called double bandle condenser type heat pump has been known well. The basic action of this double bandle condenser type heat pump is to utilize the heat energy recovered by cooling the temperature control system as the heat source for heating the temperature control system in turn and also to discharge excessive heat energy recovered to the outer air. In short, the double bandle condenser type heat pump has an advantage feasible to utilize the heat energy recovered by cooling as the heat source for heating, but this is the case wherein cooling is prior and when heating is prior, it is impossible to absorb heat energy from the outer air to utilize as the heat source for heating. Accordingly, the well known heat pump has such drawbacks as that when the heating of the temperature control system is prior, another heating device must be prepared and that the installation becomes uneconomical, and also as the outer air can not be utilized as the heat energy source for heating, installation and operation require much cost and so on.

On the other hand, a so called reversible heat pump is well known, which, while feasible to perform selectively cooling and heating of the temperature control system, can utilize the heat energy of the outer air while heating, but with this reversible heat pump, cooling and heating can not be carried out simultaneously, naturally, there is no technical idea to utilize the heat energy recovered by cooling as the heat energy for heating.

In short, none of the former heat pumps have been provided with all the functions as described hereunder, namely, (1) A function feasible to carry out the cooling and heating of the temperature control system simultaneously.
(2) A function feasible to make selectively either of said cooling and heating to be the prior action.
(3) A function feasible to utilize the heat energy recovered by cooling as the heat source for heating, when either of said cooling and heating is prior.
(4) A function feasible to make the heat energy of the outer air the heat source for heating when said heating is prior.

However, there are in air condition of building even in winter the load of air cooling caused by the construction of the outer wall having large glass windows tending to be subjected to the effect of sunlight, and the development of the inside lighting of building, and the load of air heating even in summer to heat the cooling air supplied into room up to as suitable temperature after once cooling below a required temperature to remove humidity contained in the air. Like thus, it is necessary to make either and both of cooling and heating prior, and also, out of them, whichever is prior, when both actions of cooling and heating are required, with said well known heat pumps, those requirement could not be satisfied.

SUMMARY OF THE INVENTION

The reversibly heat-recovering type heat pump through air heat source according to the present invention comprises a first means to carry out heat-exchange between refrigerant and outer air, a second means and a third means to carry out heat-exchange between refrigerant and heat transmission fluid for the temperature control system, a circulating flow passage connecting the second means in series and the third means in parallel to the first means, a compressing means to make the refrigerant reversibly flow pressedly and an expansion valve to evaporate adiabatically the refrigerant, said compressing means and said expansion valve are arranged on opposite sides with respect to said second means in said circulating flow passage and also both the compressing means and the expansion valve are disposed between said second means and the branch point to said first means and third means.

That is, when cooling is prior, the refrigerant is to be flown from said compressing means to said first means and third means, and is made to carry out cooling of the heat transmission fluid in said second means and also heating thereof in the third means, and moreover, the heat energy imparted to the refrigerant in the second means and the compressing means except necessary for heating in the third means is discharged into the outer air in the first means. Conversely, when heating is prior, the refrigerant is to be flown from the compressing means to the second means, and while the refrigerant is caused to absorb heat from the outer air in the first means, it is made to carry out cooling of the heat transmission fluid in the third means, and also the heat transmission fluid is heated in the second means with the heat energy imparted to the refrigerant in the first means, the third means and the compressing means.

In short, one of cooling and heating is carried out as the prior action in the second means, by switching over the direction of the refrigerant flow with the compressing means the other is also carried out as the auxiliary action in the third means, and in the first means the heat-exchange between the refrigerant and the outer air is caused to be carried reversibly. And, whichever of cooling and heating is used as the prior action, the heat energy imparted to the refrigerant by cooling may be made to be the heat source for heating, thereby effective use of the heat energy becomes possible.

Moreover, whichever of the prior and auxiliary action is cooling or heating as the prior action is carried out in the second means and the auxiliary action in the third means, the heat-exchange capacity of the third means may be made to be smaller than that of the second means, and thereby, for an installation which, while either of cooling and heating actions may be to be the prior action, both actions can be carried out simultaneously, the heat pump according to the present invention may be constructed compactly and economically. The value of the heat-exchange capacity of the second means and the third means is established depending on the condition under which the heat pump is used, for example atmospheric condition, the loading characteristics of the temperature control system and the like, but in general, the heat-exchange capacity of the second means is established according to the larger one out of values of the maximum cooling load and the maximum heating load of the temperature control system, and that of the third means is established according to the value of the load when the cooling load and the heating load of the temperature control system is equal. Briefly, in general, as when the cooling load is increased, the heating load tends to be reduced and when cooling load is reduced, the heating load tends to be increased, the direction of the refrigerant flow is switched over, preferably automatically, at the point when the cooling load and the heating load come to be equal, and by making the second means perform the action for that of larger load, necessary cooling and heating may be satisfied sufficiently. The present inventors have been discovered that in general a sufficient desirable function may be realized even when the heat-exchange capacity of the third means is below one-half of that of the second means and also below one-fourth of that under an ideal condition.

And, by controlling, preferably automatically controlling the ratio of the refrigerant supply to the first means and the third means, a stabilized operation may be obtained even if any unbalance between the cooling load and heating load might be caused.

Furthermore, hot water may supplied at all time by switching, preferably switching automatically the flow passage, to that which is performing the heating action out of the second means and the third means and supply water for supplying hot water.

An object of the present invention is to provide a heat pump of extremely high performance and excellent thermal efficiency in general, feasible to perform simultaneously cooling and heating of the temperature control system, to make either of cooling and heating the prior action, to utilize the heat energy recovered by cooling as the heat source for heating independantly of the prior action and also to utilize the outer air as the heat source when heating is prior.

Another object of the present invention is to provide a heat pump the installation of which may be constructed rather cheaply for the high performance thereof and which is usable economically as cheaper in running cost.

Further another object of the present invention is to provide a heat pump usable for air condition of building.

Further another object of the present invention is to provide a heat pump feasible to supply hot water simultaneously.

Further another object of the present invention is to provide a heat pump which is able to carry out, preferably automatically a stabilized running even if any unbalance is caused between cooling load and heating load, while it is to perform cooling and heating actions together with the circulating flow of the refrigerant.

Other objects and advantages will be clear from the description hereunder.

DESCRIPTION OF THE PREFERED EMBODIMENT

Figure 1:
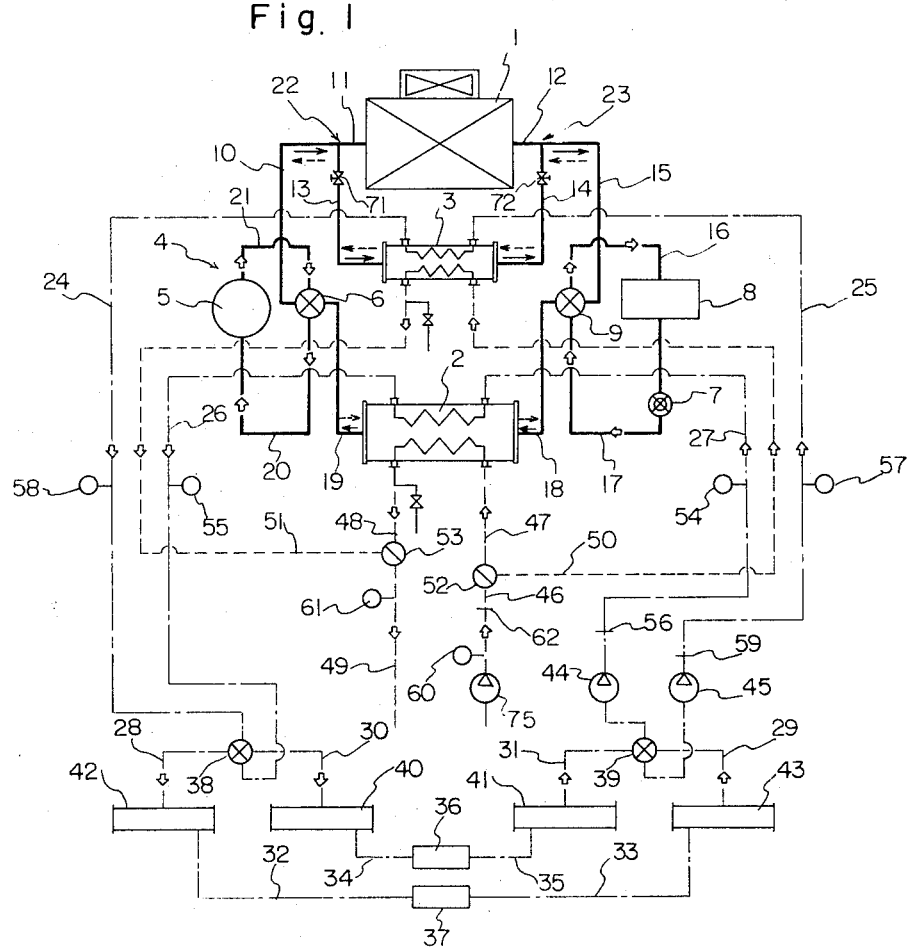
FIG. 1 is a diagrammatic view showing the heat pump according to the present invention.

A first means 1 carries out the reversible heat-exchange between the refrigerant and the outer air. As for the first means 1, a heat-exchanger such as, for example, plate fin tube or the like is used. As for the refrigerant, materials which are used in well known coolers and transmit heat from a lower temperature portion to a higher temperature portion by repetion of evaporation and condensation such as, for example, freon, ammonia and the like.

A second means 2 and a third means 3 carry out the heat-exchange between the refrigerant and the heat transmission fluid. The heat-exchange capacity of the third means 3 is smaller than that of the second means 2, generally the former is below one-half of the latter, and also the former is below one-fourth of the latter under an ideal condition. As for the second means 2 and the third means 3, a well known condenser or evaporator such as, for example, shell and tube and the like is used. The heat transmission fluid is to send heat to and absorb heat from the temperature control system, for example, the air condition of buidling, the heat-treatment for industries of chemicals, fibers, foods and the like, in general heat-exchange of the air within the temperature control system is carried out indirectly through water as for the refrigerant, but for instance, air may be also directly supplied into the temperature control system to use the air as for the refrigerant and further other various fluid may be also utilized.

A compressing means 4 comprises a compressor 5 and a 4-way valve 6, and by switching over the valve 6, the refrigerant is flown pressedly reversibly. As for the compressing means 4, that which includes a compressor the direction of discharge of which may be changed reversibly may be utilized, and as for the compressor 5, that of variable speed may be used.

An expansion valve 7 acts to evaporate adiabationally the refrigerant received in a liquid receiver 8, the refrigerant is made to flow at all times from the liquid receiver 8 to the expansion valve 7 by switching over a 4-way valve 9 despite the flowing direction of the refrigerant. The switch-over of the 4-way valve 9 is carried out, preferably automatically, according to the switch-over of the direction of the refrigerant supply such as the switch-over of said 4-way valve 6.

Pipes 10 – 21 form the circulating flow passage of the refrigerant. This circulating flow passage connects said second means 2 in series to said first means 2 and said third means 3 in parallel thereto, and while said compressing means 4 and said expansion valve 7 are arranged on opposite sides with each other with respect to said second means 2, both said compressing means 4 and expansion valve 7 are disposed between said second means 2 and the branch points 22, 23 toward said first means 1 and said third means 3.

After all, when the cooling load of the temperature control system is larger than the heating load thereof, the refrigerant is flown in the direction of the arrow of full line along said circulating flow passage, the cooling of the heat transmission fluid is carried out in the second means 2, the heating of the heat transmission fluid is carried out in said third means 3 and the heat discharge to the outer air is performed in the first means 1. Thereby, out of the heat energy recovered by cooling in the second means 2 and that imported by the compressing means 4, the energy expect that necessary for heating in the third means 3 is discharged outside through the first means 1, thereby while cooling and heating may be carried out simultaneously, the heat energy recovered by cooling may be utilized as the heat source for heating. And when the heating load causes to be larger than the cooling load, by switching over the 4-way valves 6, 9 the refrigerant is flown in the direction of the arrow of dotted line, and thereby the heat absorption from the outer air with the first means 1, the heating of the heat transmission fluid with the second means 2 and the cooling of the heat transmission fluid with the third means 3 are carried out. As the result thereof, not only the heat energy recovered by cooling is utilized as the heat source for heating, but also the outer air may be utilized as the heat source for heating, and then the running cost may be reduced extremely. And, for the excellent performance as above mentioned, the heat-exchange capacity of the third means 3 may be reduced and also the installation may be constructed rather compactly and cheaply.

Now, the pipe line of the heat transmission fluid will be explained. With pipes 24 – 35, the circulating flow passage of the heat transmission fluid is formed, which communicates said second means 2 and the third means 3 respectively to either of a cooler 36 and a heater 37. By switch-over of 4-way valves 38 and 39, preferably automatic switch-over according to the switch-over of the direction of the refrigerant supply, the circulating passage of the heat transmission fluid is arrange to act as follows. Namely, when the second means 2 is performing cooling of the heat transmission fluid, while the heat transmission fluid cooled in the second means 2 is flown circulatingly through a flow passage formed by connecting the pipes 26, 30, 34, 35, 31, 27 in this order, the heat transmission fluid heated in the means 3 is flown circulatingly through a flow passage formed by connecting the pipes 24, 28, 32, 33, 29, 25 in this order. And when the heating of the heat transmission fluid is being carried out in the second means 2, while the heat transmission fluid cooled in the third means 3 is flown circulatingly through a flow passage formed by connecting the pipes 24, 30, 34, 35, 31, 25 in this order, the heat transmission fluid heated in the second means 2 is flown circulatingly through a flow passage formed by connecting the pipes 26, 28, 32, 33, 29, 27 in this order. Like this, by switching over the flow passage of the heat transmission fluid, one of the second means 2 and the third means 3, which is performing cooling of the heat transmission fluid is connected to the cooler 36 and the other to the heater 37 respectively accordingly, even when the actions of the second means 2 and the third means 3 are interchanged, there is no unfavourable effect exerting on the cooler 36 and the heater 37 owing to the interchanging. And usually the cooler 36 and the heater 37 are provided in plurality, the coolers 36 are arranged in parallel with each other from a distributing valve 40 to a concentrating valve 41 and the heaters 37 are arranged in parallel with each others from a distributing valve 42 to a concentrating valve 43. 44 and 45 indicate respectively pumps to flow the heat transmission fluid.

Instead said coolers 36 and heaters, 37, a combined devices of cooler and heater may be provided. In such case, while to all the combined devices are connected respectively the distributing valves 40, 42 and the concentrating valves 41, 43, a switch valve is disposed at the branch point of the distributing valves 40, 42 and at the branch point of the concentrating valves 41, 43 respectively for each combined device, and thereby, with the switch-over of the switch-over valve, optionally one of the combined devices is connected with the distributing valve 40 and the concentrating valve 41 and said heat transmission fluid cooled is supplied to that combined device and another combined device is connected with the distributing valve 42 and the concentrating valve 43, and the heat transmission fluid heated is supplied to that combined device. The construction as above mentioned is convenient to control the heat control system by dividing in blocks such as in all directions and to perform air conditioning in accordance with the change of the direction of sunlight when performing air conditioning of building.

Hereinafter, the pipe line for the water for hot water supply will be explained. With pipes 46 – 51 is formed the flow passage to supply the water for hot water supply to the second means 2 and the third means 3 comprising the function feasible to perform heat-exchange between the water for hot water supply and the refrigerant. The flow passage of the water supplied with a pump 75 is switched over to either of the flow passage formed by connecting the pipes 46, 47, 48, 49 in this order or the flow passage formed by connecting the pipes 46, 50, 51, 49 in this order by the switch-over of the 3-way valves 52, 53, preferably by the automatic switch-over corresponding to the switch-over of the direction of the refrigerant flow. In short, hot water is supplied at all times by supplying selectively water for hot water supply to that performing heating out of the second means 2 and the third means 3. And also only one out of the 3-way valves 52, 53 may be provided.

Then, means for switching over the direction of the refrigerant flow described above will be explained. With respective means 54 and 55 for measuring temperature, the temperature of the heat transmission fluid at the inlet side and the outlet side of the second means is measured, and also the flow rate of the heat transmission fluid supplied into the second means 2 is measured with a means 56 for measuring flow rate, the heat-exchange load in the second means 2 is computed with those measured values. And similarly the heat-exchange load in the third means 3 is computed through means 57, 58 for measuring temperature and means 59 for measuring flow rate, and also the heating load for the hot water supply is computed through means 60, 61 for measuring temperature and means 62 for measuring flow rate. And when the second means 2 is performing cooling of the heat transmission fluid, the value based on computing the sum of the heating load of the heat transmission fluid and the heating load of the water for the hot water supply in the third means is compared with the value of the cooling load in the second means 2, if the former is larger than the latter, the direction of the refrigerant flow is to be switched over to perform heating of the heat transmission fluid and the water for hot water supply in the second means 2. And when heating of the heat transmission fluid is being performed in the second means 2, the value based on computing the sum of the heating load of the heat transmission fluid and the heating load for the hot water supply in the second means 2 is compared with the value of the cooling load in the third means 3, if the latter is larger than the former, the direction of the refrigerant flow is to be switched over to perform cooling of the heat transmission fluid in the second means 2.

Figure 2:
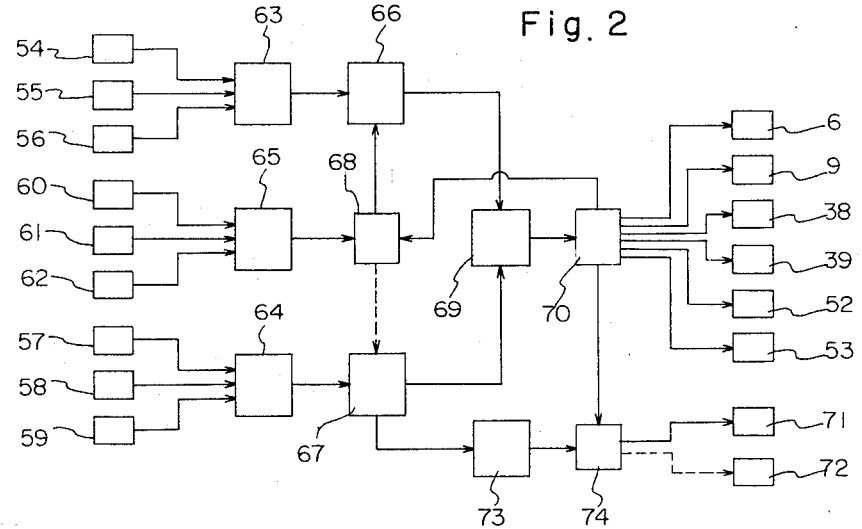
FIG. 2 is a block diagram showing the control mechanism for the heat pump according to the present invention.

It is more advantageous when means for performing automatically the switch-over of said valves 6, 9, 38, 39, 52, 53 together with the switch-over of said refrigerant flow is utilized, the mode of an embodiment thereof is shown in FIG. 2.

In this case, said means 54, 55, 57, 58, 60, 61 for measuring temperature and said means 56, 59, 62 for measuring flow rate respectively transmit the measured values to units 63, 64, 65 for computing heat-exchange load. Said unit 63 computes the heat-exchange load of the heat transmission fluid in the second means 2, said unit 64 the heat-exchange load of the heat transmission fluid in the third means 3 and said unit 65 the heating load for the hot water supply, respectively. The value computed with said unit 63 is transmitted to unit 66 for integrating and the value computed with said unit 64 is transmitted to unit 67 for integrating, respectively, and the value computed with said unit 65 is transmitted selectively to either of the unit 66, 67 for integrating by the action of unit 68 for switching over signal transmitting line, that is, when the second means 2 is performing heating of the heat transmission fluid, to the unit 66 for integrating and when the third means 3 is performing heating of the heat transmission fluid, to the unit 67 for integrating, selectively. The informations from both units 66, 67 for integrating are transmitted to unit 69 for comparing load, and by the unit 69 the cooling load and the heating load are judged which is larger. Based on the judgement of said unit 69 for comparing load, prescribed switch-over instruction signals are transmitted from unit 70 for sending instruction signal to each of the valves 6, 9, 38, 39, 52, 53, thereby out of cooling and heating, that which is larger in load is performed with the second means 2, and also similtaneously, out of the second means 2 and the third means 3, to that which carries out heating is supplied the water for hot water supply, and the heat transmission fluid cooled is supplied to said cooler 36 and that heated to said heater 37, respectively. And, the unit 68 for switching over the signal transmitting line performs the prescribed action as described above by the unit 70 for sending instruction signal. By incorporating automized system as above, while the labour for management may be reduced, the installation may be prevented from malfunction.

Means for controlling proportionally the quantity of refrigerant supplied to the first means 1 and the third means 3 will be explained.

The quantity of refrigerant supplied to the third means 3 is controlled to be near or corresponding to the minimum quantity required to satisfy necessary heat-exchange in the third means 3 with control valves 71, 72 provided in said pipes 13, 14 respectively. For example, as shown in FIG. 2, the value of the heat-exchange load of the third means 3 is transmitted from the unit 67 for integrating to the unit 73 for detecting the variation of load, and controlling signal in accordance with the variation of load is impacted from said unit 73 selectively to the control valve 71 or 72, and thereby the control valve 71 or 72 is activated to perform the controlling action as abovementioned. The selective transmission of signal to the control valve 71 or 72 is carried out by unit 74 for switching over the signal transmission line, this unit 74 is actuated automatically by instruction of said unit 70 for sending instruction signal, and thereby, the control valve 71 or 72 located at the inlet side of the third means 3 is controlled with respect to flow of the refrigerant. And, the opening of the control valve 71 or 72 which is not controlled by the unit 73 for detecting the variation of load is kept at the maximum thereof. As this, by controlling the quantity of the refrigerant supplied to the third means 3, creation of unbalance between the cooling load and the heating load may be prevented surely and stabilized operation may be carried out.

Further, various means known as controlling system may be applicable to the present invention, and the present invention never be limited by any concrete construction of the system.

What we claim is:

1. A reversibly heat-recovering type heat pump through air heat source, comprising first means for carrying out heat-exchange between refrigerant and outer air, second and third means for carrying out heat-exchange between said refrigerant and heat transmission fluid of the temperature control system, a circulating flow passage of said refrigerant connecting said second means in series to said first means and said third means in parallel thereto, compressing means for flowing pressedly said refrigerant reversibly, an expansion valve for evaporating adiabatically said refrigerant, said compressing means and said expansion valve being arranged on opposite sides with each other with respect to said second means in said circulating flow passage and both the compressing means and the expansion valve being disposed between said second means and the branch point of said first means and third means, and thereby, while the heat-exchange between said refrigerant and said outer air being carried out reversibly, in one of said second means and third means being carried out the cooling action of said heat transmission fluid and in the other the heating action of the heat transmission fluid being carried out, simultaneously with each other.

2. A reversibly heat-recovering type heat pump through air heat source according to claim 1, wherein both said second means and third means have the function feasible to carry out heat-exchange between the water for hot water supply and said refrigerant, and further comprises a valve for switching over to supply hot water by supplying selectively said water for hot water supply to that which is performing heating action, out of said second means and third means.

3. A reversibly heat-recovering type heat pump through air heat source according to claim 2, further comprising means for actuating automatically said valve for switching over the flow passage for the water for hot water supply corresponding to the switch-over of the direction of said refrigerant flow.

4. A reversibly heat-recovering type heat pump through air heat source according to claim 1, wherein the heat-exchange capacity of said third means is smaller than that of said second means.

5. A reversibly heat-recovering type heat pump through air heat source according to claim 4, wherein the heat-exchange capacity of said third means is below one-half of that of said second means.

6. A reversibly heat-recovering type heat pump through air heat source according to claim 4, further comprising means for comparing the value of the cooling load for heat transmission fluid with the value of the heating load for said heat transmission fluid, and thereby, out of the cooling action and the heating action of said heat transmission fluid, the action while requires a larger load being carried out by said second means.

7. A reversibly heat-recovering type heat pump through air heat source according to claim 6, further comprising means for switching over automatically the direction of said refrigerant flow with said compressing means based on the information from the means for comparing the value of the cooling load with the value of the heating load, and thereby holding automatically the state wherein the action requiring said larger load being carried out by the second means.

8. A reversibly heat recovering type heat pump through air heat source according to claim 1, further comprising a control valve for regulating the ratio of the quantity of said refrigerant supplied to said first means and third means, means for detecting the necessary minimum quantity of refrigerant to be supplied for satisfying necessary heat-exchange in said third means, and thereby the quantity of said refrigerant to be supplied to said third means being neared to the necessary minimum quantity necessary to satisfy the heat-exchange required in the third means.

9. A reversibly heat-recovering type heat pump through air heat source according to claim 8, further comprising means regulating automatically said control valve based on the information from the means for detecting the necessary minimum quantity of said refrigerant to be supplied and thereby holding automatically the state wherein the quantity of the refrigerant to be supplied to said third means is near to the necessary minimum quantity for satisfying necessary heat-exchange in the third means.

10. A reversibly heat-recovering type heat pump through air heat source, according to claim 1, further comprising coolers and heaters for carrying out heat-exchange between said heat transmission fluid and the air supplied into said temperature control system, a circulating flow passage of the heat transmission fluid communicating each of said second means and third means respectively to either of said cooler and heater, and a valve for switching over the circulating flow passage of said heat transmission fluid in a state wherein out of said second means and third means, that which carries out cooling of said heat transmission fluid is connected to said cooler and the other is connected to said heater.

11. A reversibly heat-recovering type heat pump through air heat source according to claim 10, further comprising means for actuating automatically the valve for switching over the circulating flow passage of said heat transmission fluid in correspondence to the switch-over of the direction of said refrigerant caused by said compressing means.

* * * * *